United States Patent
Marr et al.

(10) Patent No.: US 9,889,385 B2
(45) Date of Patent: Feb. 13, 2018

(54) VIDEO GAME STORAGE MANAGEMENT

(71) Applicant: Activision Publishing, Inc., Santa Monica, CA (US)

(72) Inventors: Michael D. Marr, Monroe, WA (US); Keith S. Kaplan, Bothell, WA (US)

(73) Assignee: Activision Publishing, Inc., Santa Monica, CA (US)

( * ) Notice: Subject to any disclaimer, the term of this patent is extended or adjusted under 35 U.S.C. 154(b) by 170 days.

(21) Appl. No.: 14/703,678

(22) Filed: May 4, 2015

(65) Prior Publication Data

US 2016/0001189 A1 Jan. 7, 2016

Related U.S. Application Data

(60) Provisional application No. 62/020,789, filed on Jul. 3, 2014.

(51) Int. Cl.
  *G06F 17/00* (2006.01)
  *A63F 13/95* (2014.01)
  *A63F 13/79* (2014.01)
  *A63F 13/30* (2014.01)

(52) U.S. Cl.
  CPC ............. *A63F 13/95* (2014.09); *A63F 13/30* (2014.09); *A63F 13/79* (2014.09)

(58) Field of Classification Search
  USPC .................................................... 463/40–44
  See application file for complete search history.

(56) References Cited

U.S. PATENT DOCUMENTS

| | | | | |
|---|---|---|---|---|
| 7,811,174 B2* | 10/2010 | Whitten | .................. | A63F 13/10 463/30 |
| 8,751,829 B2* | 6/2014 | Vysogorets | ............. | G06F 21/34 713/168 |
| 2010/0105481 A2* | 4/2010 | Hogan | .................... | A63F 13/12 463/42 |
| 2011/0077086 A1* | 3/2011 | Grube | ..................... | A63F 13/12 463/42 |
| 2016/0206959 A1* | 7/2016 | Nelson | .................... | A63F 13/58 |

* cited by examiner

*Primary Examiner* — Ronald Laneau
(74) *Attorney, Agent, or Firm* — Klein, O'Neill & Singh, LLP

(57) ABSTRACT

Aspects of the invention provide for management of storage space utilized by video game information based in part on the engagement of the video game user. For example, one aspect of the invention provides a method of providing information for play of a video game, comprising determining a storage parameter based on user game play related information, the storage parameter indicative of level of commitment of the user to the video game; outside of a game play session of the video game, providing, over a communications network, first information to a compute device associated with the user, the first information for use in providing for game play of the video game by the compute device, the first information being an amount of information determined based on the storage parameter; and during a game play session of the video game, providing additional information for use in providing for game play of the video game by the compute device.

9 Claims, 7 Drawing Sheets

US 9,889,385 B2

VIDEO GAME STORAGE MANAGEMENT

CROSS REFERENCE TO RELATED APPLICATIONS

This application claims the benefit of the filing date of U.S. Provisional Patent Application No. 62/020,789, filed on Jul. 3, 2014, the disclosure of which is incorporated by reference herein.

BACKGROUND OF THE INVENTION

The present invention relates generally to video games, and more particularly to provision of video game content to memory resource constrained devices.

Video games provide fun and enjoyment for many. Video games allow users to participate in a variety of simulated activities. Video games allow users, using computer devices, to perform roles and experience activities that the users may not be able or desire to experience directly, whether due to cost, danger, or equipment concerns, or simply due to a role or activity being a fantasy. In providing those simulated activities, video games generally allow a user to immerse him or herself in a richly detailed and extensive virtual world populated by a cast of characters, at least one of which is usually controlled by the user.

Video games are often played on compute devices in the form of game consoles or personal computers. Often, however, users may additionally or instead have a compute device in the form of a tablet, smartphone, or other device. These compute devices often exhibit differences from the game consoles and personal computers generally used for video game play. These differences may include differences in device input, for example tablets and smartphones often use touchscreen inputs, and reduced device capabilities. One capability that may be reduced, for example in tablets and smartphones, is memory available for storage of video game play program instructions and data.

Video games often utilize large amounts of data in providing for video game play. Display of colorful, detailed, and/or possibly realistic screen displays of characters in a virtual world may increase enjoyment of video game play, but such displays often require significant amounts of stored data. For some devices, such as smartphones or other resource constrained devices, full and complete sets of program instructions and data for a video game may overwhelm the device. Even if a particular device may have a capability to store program instructions and data for a full video game, a user may, at times, desire that the device instead store other voluminous data, for example large numbers of large audio, video, or audiovisual files.

Device resource constraint may therefore impact a user's ability to fully enjoy video games, at least without causing the user to forego possibly some other utilization of their device.

BRIEF SUMMARY OF THE INVENTION

Aspects of the invention provide for management of storage space utilized by video game information. One aspect of the invention provides a method of providing information for play of a video game, comprising determining a storage parameter based on user game play related information, the storage parameter indicative of level of commitment of the user to the video game; outside of a game play session of the video game, providing, over a communications network, first information to a compute device associated with the user, the first information for use in providing for game play of the video game by the compute device, the first information being an amount of information determined based on the storage parameter; and during a game play session of the video game, providing additional information for use in providing for game play of the video game by the compute device.

These and other aspects of the invention are more fully comprehended upon review of this disclosure.

DETAILED DESCRIPTION

Figure 1:
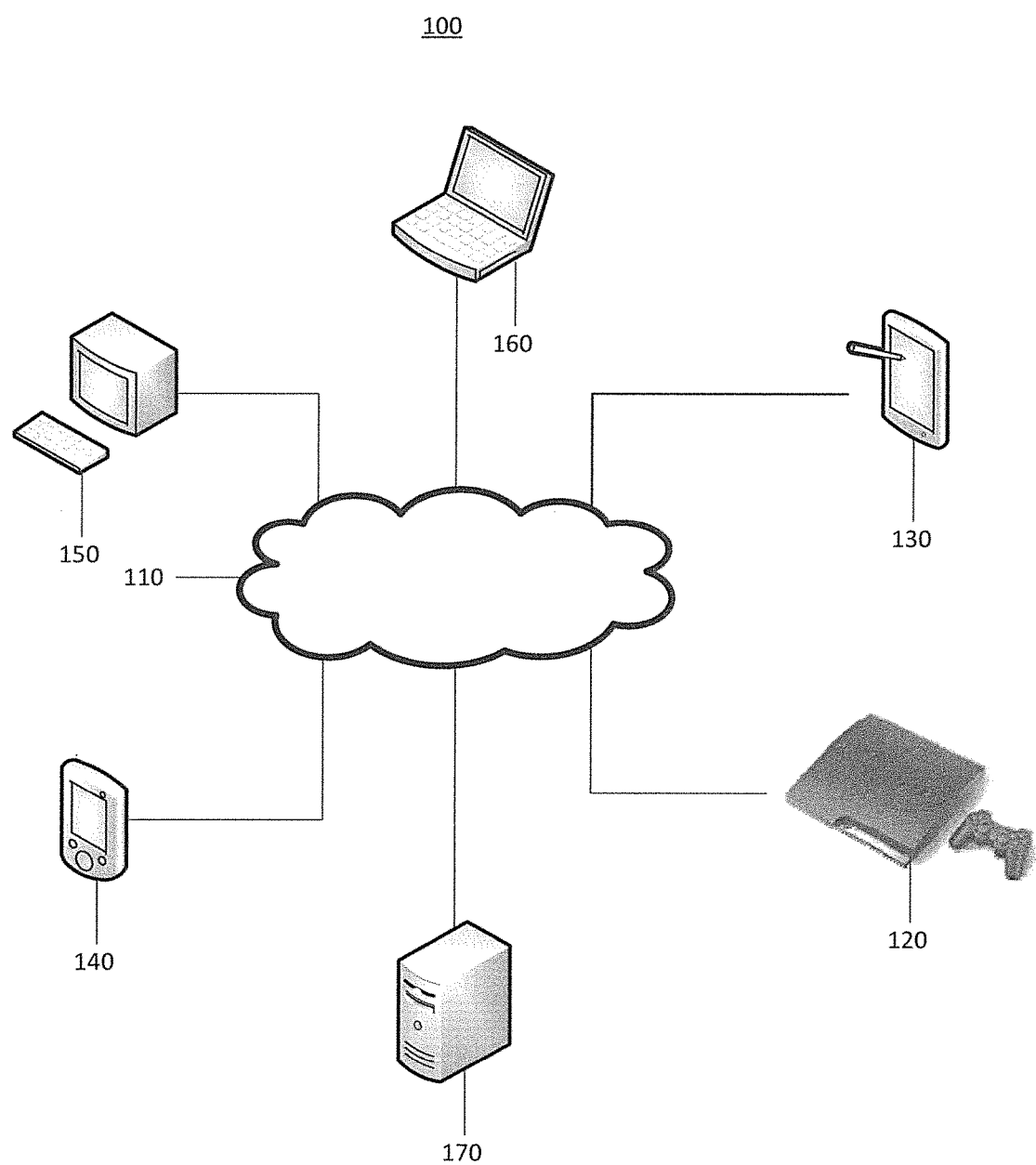
FIG. 1 is a block diagram including elements of systems in accordance with aspects of the invention.

FIG. 1 is a block diagram illustrating an exemplary system 100 in accordance with aspects of the present invention. System 100 includes a communication network 110, which may be the Internet, for example.

System 100 includes a game server 170. Game server 170 provides function related to the online distribution, operation, and, in some embodiments, hosting of video games. In some embodiments, game server 170 may distribute one or more video games by, for example, making the one or more video games available for download to player computers 120-160. In some embodiments, game server 170 may host one or more instances of multiplayer online video games, or coordinate the hosting of such games, and allow a plurality of players to join and participate in the multiplayer online video game.

System 100 also includes player computers 120-160 and game server 170. Player computers 120-160 may comprise various compute devices suitable for executing video games and communicating over communications network 110. In this example, system 100 comprises a game console 120 with associated monitor and game controller. In addition to the game console, player computers in various embodiments may instead or in addition comprise any other suitable compute devices such as, for example, tablet 130, smartphone 140, desktop computer 150, and laptop computer 160. The player computers 120-160 each have one or more processors, memory, communication circuitry, and associated hardware. Player computers 120-160 may communicate with other player computers 120-160 and/or components of system 100 by sending and receiving data through communication network 110. Of course, the number of devices shown in FIG. 1 is merely exemplary, and in many embodiments, many more devices may be present.

During game play the player computers 120-160 execute program instructions to provide for play of the video game. Video game players provide game play inputs using their respective input devices, for example touchscreens, game controllers, keyboards, mice, etc., and the associated displays and monitors display game play events.

The player computers 120-160 receive, over the communications network 110, video game information from game server 170. The video game information may comprise executable program instructions for executing a video game, and/or game data used during execution of the video game. The game data may comprise, for example, some or all of user controlled character data, level data, animation data, or other data. The level data may include, for example, some or all of data regarding a virtual world or a portion of a virtual world, and/or information of video game controlled virtual characters populating the virtual world.

In many embodiments, the executable program instructions are provided to the player computers prior to a user playing the game, e.g., prior to a game play session. None, some, or all of the game data may also be provided to the player computers prior to the game session, dependent on a storage parameter for the user. In some embodiments, the storage parameter is based on user game play related information. The user game play related information may include some or all of a quantity of time of game play of the video game by the user within an interval of time, a quantity of time of continuous game play of the video game by the user, a number of toys associated with the video game owned by the user, available storage space on the computer device, user game play level history, user game character usage, and user network connection metrics. Game data not provided prior to a game play session may be provided to a particular player computer during game play, for example, upon a request by the particular player computer.

Figure 2:
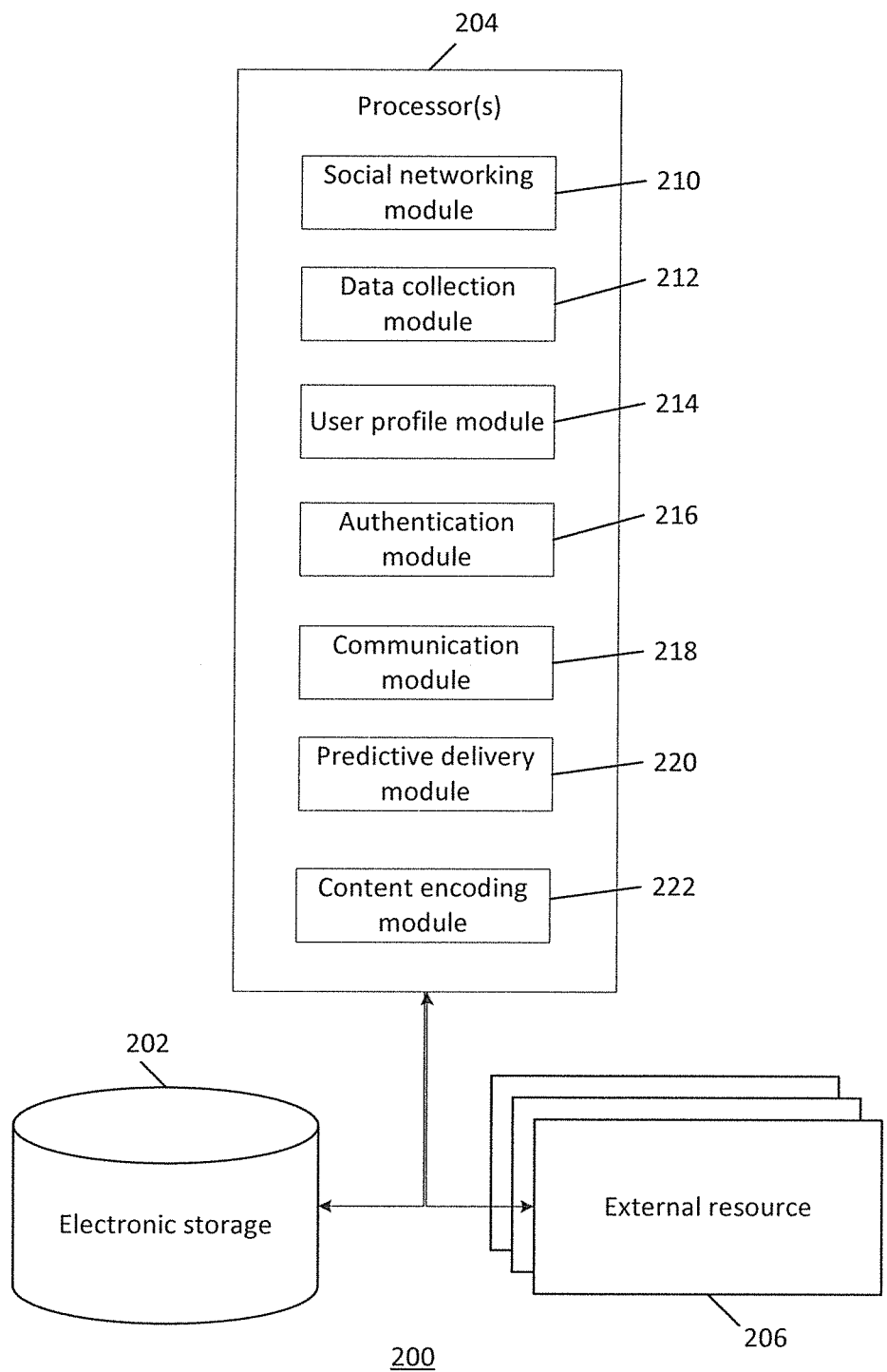
FIG. 2 is a block diagram of a server system in accordance with aspects of the invention.

FIG. 2 is an example of a block diagram of a portion of a game server, for example the game server 170 of FIG. 1, useful in accordance with aspects of the invention. The portion of the game server may be considered a content server 200. Content server 200 is coupled to a network (not explicitly shown), for example the Internet. In some implementations, content server 200 may comprise one or more of electronic storage 202, processor(s) 204, external resources 206, and/or other components. The various components of content server 200 may be configured for electronic communication among one another. Such communication may be accomplished via one or more networks, one or more direct connections, one or more wireless connections, one or more wired connections, and/or other electronic communication media. Content server 200 may be in communication with end user devices and other client computing platforms using a client/server architecture. End users, using end user devices, access content server 200 directly or indirectly through an interface internal to an application such as a videogame or media streaming application or client application and/or through a web browser. In some embodiments, content server 200 may be part of an application-related server, such as a videogame server or media streaming server. Additionally or alternatively, content server 200 may be separate from an application-related server, such as a videogame server or media streaming server.

Processor(s) 204 may be configured to provide information processing capabilities within content server 200. For example, processor(s) 204 may be configured to execute computer program modules that may include one or more of a social networking module 210, a data collection module 212, a user profile module 214, an authentication module 216, a communication module 218, a predictive delivery module 220, a content encoding module 222, and/or other modules. In various embodiments, these modules may perform various operations as further discussed herein.

In some embodiments, content encoding module 222 performs operations relating to encoding a content file into a plurality of channels. In some embodiments, content encoding module 222 encodes content files based in part on information stored in other modules, such as social networking module 210, data collection module 212, and user profile module 214.

In some embodiments, predictive delivery module 220 performs operations relating to predictively pre-delivering content to end users. In some embodiments, predictive delivery module 220 mines data collected by other modules such as social networking module 210, data collection module 212, and user profile module 214.

In some embodiments, social networking module 210 provides the framework for user-to-user interactions. Social networking module 210 may include a database that stores user relationships, user profiles, user messages, and user social data. Social networking module 210 may provide for social networking features in accordance with the present invention. For example, social networking module 210 may provide the framework to allow predictive pre-delivery of content based on the behavior and consumption patterns of an end user's social connections. Examples of social networks include websites such as Facebook and Twitter, and also include social networks within other frameworks such as those found in Xbox Live and the PlayStation Network.

In some embodiments, data collection module 212 performs operations relating to the collection of information regarding end users, social networks, application data, and network connection quality indicators. In some embodiments, the data collected is used by other modules such as social networking module 210, predictive delivery module 220, and content encoding module 222.

In some embodiments, user profile module 214 receives and/or determines end user information, for example end user login names and passwords, email addresses, user skill levels, device capabilities, subscriptions, demographics, application preferences, and/or financial information (e.g., credit card information, billing addresses, and any other information required to complete potential e-commerce transaction). In addition, in some embodiments user profile module 214 determines a storage parameter which may be used to determine items to be stored, prior to a game session, on a user computer device.

In some embodiments, authentication module 216 performs operations relating to authentication of end users. In some embodiments, communications module 218 performs operations relating to communication with storage and/or external resources, as well as communicating data to end users and other content servers over a network, for example the Internet.

In some implementations, electronic storage 202 may include content and information relating to content and end users. In some implementations, electronic storage 202 may comprise non-transitory electronic storage media that electronically stores information. Electronic storage 202 may include one or both of system storage that is provided integrally (e.g., substantially non-removable) with content server 200 and/or removable storage that is removably connectable to content server 200 via, for example, a port (e.g., a USB port, a firewire port, etc.) or a drive (e.g., a disk drive, etc.). Electronic storage 202 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 202 may include virtual storage resources, such as storage resources provided via a cloud and/or a virtual private network. Electronic storage 202 may store software algorithms, information determined by processor 204, and/or other information that enables content server 200 to function properly. Electronic storage 202 may be a separate component within content server 200, or electronic storage 202 may be provided integrally with one or more other components of content server 200. For example, in certain implementations, the non-transitory electronic storage media of electronic storage 202 may include a cache (e.g., L1 cache, L2 cache, etc.) of processor 204.

In some implementations, electronic storage 202, processor(s) 204, external resources 206, and/or other components (e.g., additional instances of content servers) may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which electronic storage 202, processor(s) 204, external resources 206, and/or other components may be operatively linked via some other communication media.

In some implementations, the external resources 206 may include services and information sources external to content server 200, for example, third-party social networking services external to content server 200, third-party content databases and catalogs, web hosting services, game server services, media streaming services, etc. In some implementations, some or all of the functionality attributed herein to external resources 206 may be provided by resources included in content server 200.

In some implementations, processor(s) 204 may include one or more of a digital processor, an analog processor, a digital circuit designed to process information, an analog circuit designed to process information, a state machine, and/or other mechanisms for electronically processing information. Although processor(s) 204 is shown in FIG. 2 as a single entity, this is for illustrative purposes only. In some implementations, processor(s) 204 may include a plurality of processing units. These processing units may be physically located within the same device, or processor(s) 204 may represent processing functionality of a plurality of distributed devices operating in coordination.

Processor(s) 204 may be configured to execute social networking module 210, data collection module 212, user profile module 214, authentication module 216, communication module 218, predictive delivery module 220, content encoding module 222, and/or other modules. Processor(s) 204 may be configured to execute modules 210, 212, 214, 216, 218, 220, 222, and/or other modules by software; hardware; firmware; some combination of software, hardware, and/or firmware; and/or other mechanisms for configuring processing capabilities on processor(s) 204.

It should be appreciated that although modules 210, 212, 214, 216, 218, 220, and 222 are illustrated in FIG. 2 as being co-located within a single processing unit, in implementations in which processor(s) 204 includes multiple processing units, one or more of modules 210, 212, 214, 216, 218, 220, and 222 may be located remotely from the other modules. The description of the functionality provided by the different modules 210, 212, 214, 216, 218, 220, and 222 provided below is for illustrative purposes, and is not intended to be limiting, as any of modules 210, 212, 214, 216, 218, 220, and 222 may provide more or less functionality than is described. For example, one or more of modules 210, 212, 214, 216, 218, 220, and 222 may be eliminated, and some or all of its functionality may be provided by other ones of modules 210, 212, 214, 216, 218, 220, and 222. As another example, processor 204 may be configured to execute one or more additional modules that may perform some or all of the functionality attributed below to one of modules 210, 212, 214, 216, 218, 220, and 222.

Figure 3:
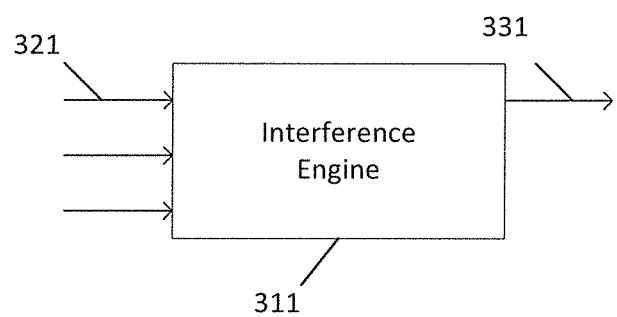
FIG. 3 is a block diagram of a portion of a system useful in providing for storage management in accordance with aspects of the invention.

FIG. 3 is a block diagram showing an inference engine 311. The inference engine resides in either a player computer device or a game server, depending on implementation. In many embodiments the inference engine comprises program instructions executed by a processor, for example a process of the player computer device or the game server.

The inference engine determines, or infers, a storage parameter 331 based on user game play related data 321. The storage parameter is used to determine an amount of video game information to store on the player computer device outside of game play sessions. In some embodiments the inference engine determines the storage parameter based on some or all of a quantity of time of game play of the video game by the user within an interval of time, a quantity of time of continuous game play of the video game by the user, a number of toys associated with the video game owned by the user, available storage space on the computer device, user game play level history, user game character usage, and user network connection metrics.

In some embodiments the inference engine calculates a score based on the user game play related data, and maps the score to a predefined category. In some embodiments the predefined category may be considered a representative game player persona, which may be, for example, an avid game player, a serious game player, a regular game player, or an infrequent game player. In effect, a user may be mapped to a representative game player persona by the inference engine, and the representative game player persona may be considered the storage parameter. In some embodiments different amounts of video game information may be provided and/or stored on a particular player computer device depending on the determined representative game player persona for the user. For example, increased amounts of video game information may be stored on a player computer device if the user is an avid game player instead of a regular game player.

In some embodiments the score is directly used as the storage parameter, instead of mapping the score to a range of categories that is less than a range of possible scores.

In some embodiments the storage parameter may also be adjusted in view of a user request. For example, in some embodiments a user may request that increased storage be utilized, or conversely that decreased storage be utilized. The request may, in some embodiments, be used to bias the storage parameter either up or down.

In some embodiments the inference engine is implemented on a server, for example a server providing video game information. In such embodiments, the server may receive information from the player computer device regarding user game play patterns and other information, and determine the storage parameter. The storage parameter may be used by the server to determine video game information to provide to the player computer device outside of a game play session. The storage parameter may also be transmitted to the player computer device to allow the player computer device to determine files or information to delete from storage at conclusion of a game play session.

In some embodiment the inference engine is implemented on a player computer device. In such embodiments the inference engine may track user game play patterns and other information, and determine the storage parameter. The player computer device may use the storage parameter to determine which video game information to request and to store outside of game play sessions.

Figure 4:
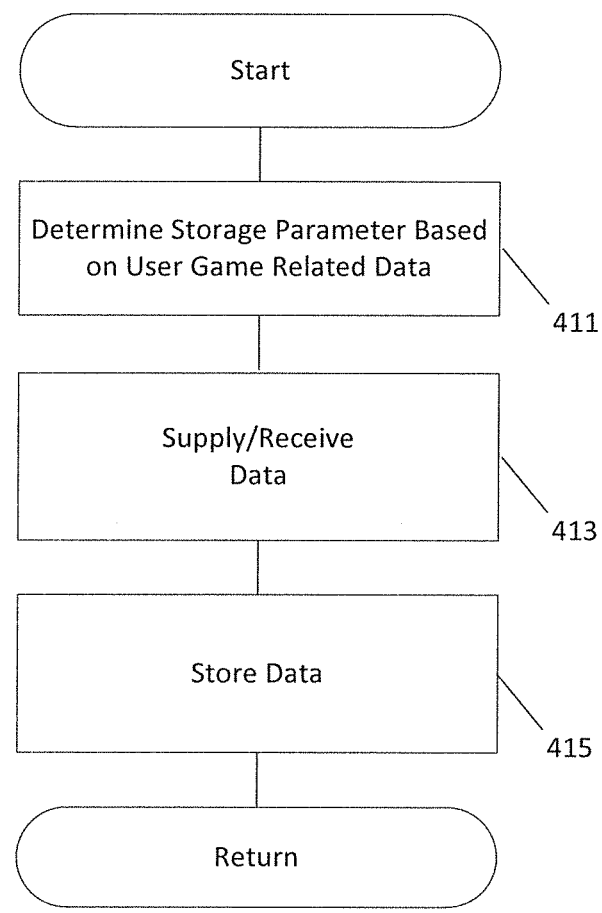
FIG. 4 is a flow diagram of a process in accordance with aspects of the invention.

FIG. 4 is a flow diagram of a process in accordance with aspects of the invention. The process of FIG. 4 may be performed by a player computer device or a player computer device and a server, depending on implementation.

In block 411 the process determines a storage parameter based on user game related data. The processing of block 411 may be performed, for example, by the inference engine of FIG. 3.

In block 413 the process supplies and/or receives video game information. In most embodiments this occurs outside of, and generally prior to, a game play session. The process may supply video game information from a game server, with the process receiving the video game information at the player computer device, depending on whether the process is being performed by the server, by the player computer device, or both. The video game information supplied or received depends, in many embodiments on the determined storage parameter.

In block 415 the process stores the video game information on the player computer device.

The process thereafter returns.

Figure 5:
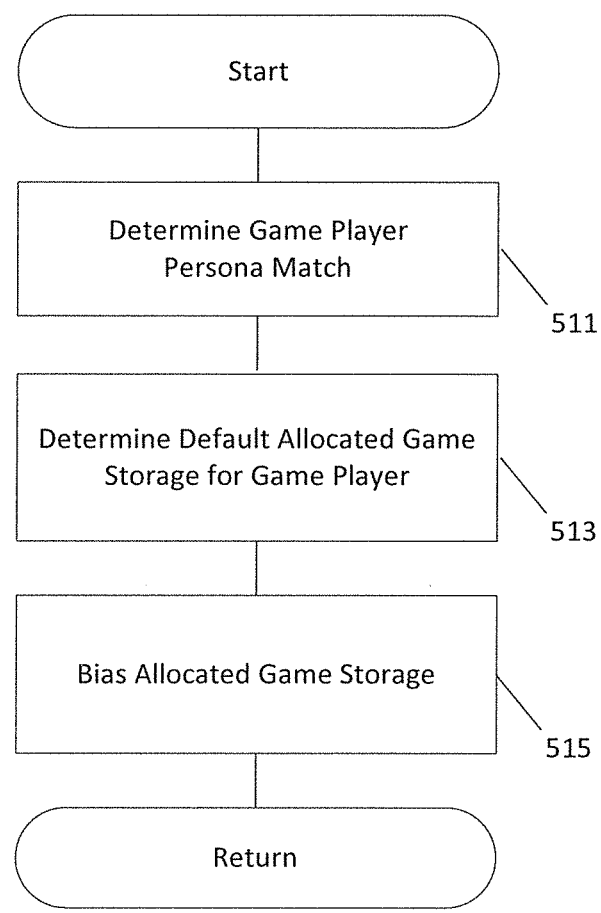
FIG. 5 is a flow diagram of a further process in accordance with aspects of the invention.

FIG. 5 is a flow diagram of a process in accordance with aspects of the invention. The process of FIG. 5 may be performed by a player computer device or a player computer device and a server, depending on implementation.

In block 511 the process determines a representative game player persona match. The operations of block 511 may be performed, for example, by the inference engine of FIG. 3.

In block 513 the process determines a default allocated game storage amount for a user. The default allocated game storage amount is based on the representative game player persona match, and, in some embodiments, may also be based on device characteristics of a player computer device associated with the user. In some embodiments the default allocated game storage amount may also be based on characteristics, for example as determined by metrics, of a computer network linking the player computer device and a game server.

In block 515 the process modifies, or biases, the default allocated game storage amount based on a user input to obtain a biased allocated game storage amount. The user input may be, for example, a numeric entry, or entered by way of an adjustable slider display, or some other user input. The user input may reflect a request by the user to increase or decrease amount of storage utilized for game data.

The process thereafter returns.

Figure 6:
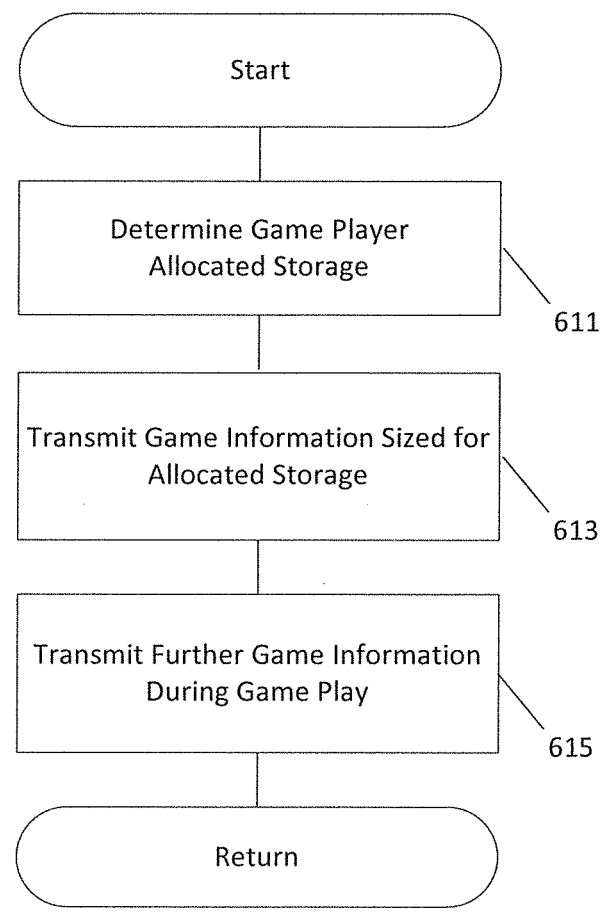
FIG. 6 is a flow diagram of a further process in accordance with aspects of the invention.
Figure 7:
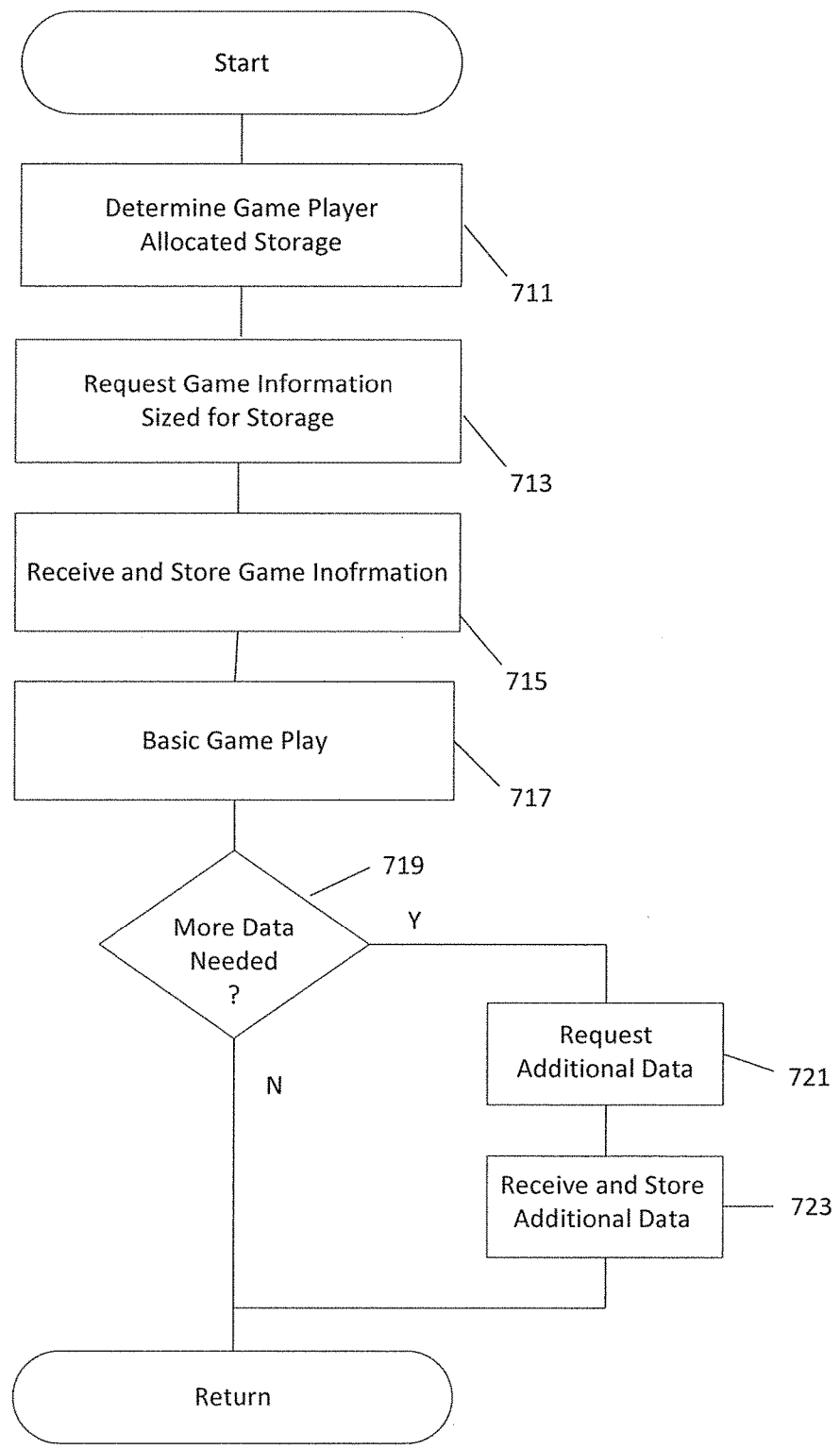
FIG. 7 is a flow diagram of a further process in accordance with aspects of the invention.

FIG. 6 is a flow diagram of a process in accordance with aspects of the invention. The process of FIG. 6 may be performed by a server or components of a server, for example as discussed with respect to FIGS. 1 and/or 2.

In block 611 the process determines an allocated game storage amount. The allocated game storage amount may be based on a determined storage parameter, for example as discussed with respect to the other figures.

In block 613 the process transmits, over a communications network and to a player computer device, game information sized for the allocated storage amount. The game information generally includes program instructions for execution of a video game, and some data used in such execution. Generally the operations of block 613 are performed during periods in which the player computer device is not being used for play of the video game.

In block 615 the process transmits, over the communications network and to the player computer device, further game information. The further game information may include, for example, information related to a virtual world of game play, and may be specific to a particular level of game play. In some embodiments the information is transmitted in response to receipt of a request from the player computer for further game information. In most embodiments the request is provided while the player computer device is being used for play of the video game.

The process thereafter returns.

Although the invention has been discussed with respect to various embodiments, it should be recognized that the invention comprises the novel and non-obvious claims supported by this disclosure.

What is claimed is:

1. A method of providing information for play of a video game, comprising:

determining a storage parameter based on user game play related information, the storage parameter indicative of level of commitment of the user to the video game;

outside of a game play session of the video game, providing, over a communications network, first information to a computer device associated with the user, the first information for use in providing for game play of the video game by the computer device, the first information being an amount of information determined based on the storage parameter, the first information comprising executable code; and during a game play session of the video game, providing additional information for use in providing for game play of the video game by the computer device, the additional information comprising level data;

wherein the user game play related information comprises at least one of:

a quantity of time of game play of the video game by the user within an interval of time, a quantity of time of continuous game play of the video game by the user, a number of toys associated with the video game owned by the user, available storage space on the computer device, user game play level history, user game character usage, and user network connection metrics.

2. The method of claim 1, wherein the user game play related information comprises the indication of the quantity of time of game play of the video game by the user within the interval of time.

3. The method of claim 1, wherein a plurality of toys are associated with the video game, and the user game play related information comprises an indication of the number of the toys owned by the user.

4. The method of claim 1, wherein the storage parameter indicates a game player category.

5. The method of claim 1, wherein the storage parameter is a normalized score.

6. The method of claim 1, wherein the storage parameter is a function of at least a plurality of:

the quantity of time of game play of the video game by the user within the interval of time;

the quantity of time of continuous game play of the video game by the user;

the number of toys associated with the video game owned by the user;

the available storage space on the computer device, the user game play level history, the user game character usage; and the user network connection metrics.

7. The method of claim 1, wherein the first information further comprises at least some of character data or level data.

8. The method of claim 1, wherein the additional information further comprises character data.

9. The method of claim 1, wherein the first information additionally includes at least some character data and/or level data, with an amount of character data and/or level data based on the storage parameter.

* * * * *